(12) United States Patent
Lee et al.

(10) Patent No.: US 7,267,446 B2
(45) Date of Patent: Sep. 11, 2007

(54) PROJECTION DISPLAY (75) Inventors: Young-chol Lee, Gunpo-si (KR); Won-yong Lee, Suwon-si (KR); Kirill Sokolov, Suwon-si (KR); Kye-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 11/061,632

(22) Filed: Feb. 22, 2005

(65) Prior Publication Data

US 2005/0259229 A1   Nov. 24, 2005

(30) Foreign Application Priority Data

May 22, 2004   (KR) ...................... 10-2004-0036654

(51) Int. Cl.
*G03B 21/26* (2006.01)
(52) U.S. Cl. .......................................... 353/94; 353/30
(58) Field of Classification Search ................. 353/30, 353/31, 33, 81, 94, 97; 362/26, 555, 582; 313/372, 475
See application file for complete search history.

(56) References Cited

U.S. PATENT DOCUMENTS

| | | | | |
|---|---|---|---|---|
| 5,394,204 | A | * | 2/1995 | Shigeta et al. ................. 353/31 |
| 6,508,571 | B2 | * | 1/2003 | Chuang ....................... 362/237 |
| 7,101,049 | B2 | * | 9/2006 | Shindoh ...................... 353/81 |
| 2005/0259224 | A1 | * | 11/2005 | Lee et al. ..................... 353/31 |

FOREIGN PATENT DOCUMENTS

| | | |
|---|---|---|
| JP | 8-501644 | 2/1996 |
| JP | 2000-147658 | 5/2000 |
| JP | 2000-155291 | 6/2000 |
| JP | 2000-180962 | 6/2000 |
| JP | 2001 305657 | 11/2001 |
| JP | 2003-186110 | 7/2003 |
| JP | 2004-29770 | 1/2004 |
| JP | 2004-70018 | 3/2004 |
| JP | 2004-119364 | 4/2004 |
| KR | 1999-7132 | 1/1999 |
| KR | 2000-24815 | 8/2000 |
| KR | 2003-37567 A | 5/2003 |
| KR | 2003-38083 A | 5/2003 |
| KR | 2004-9312 A | 1/2004 |

OTHER PUBLICATIONS

Korean Office Action dated Nov. 28, 2005 issued in KR 2004-36654.
U.S. Appl. No. 11/061,901, filed Feb. 22, 2005.

* cited by examiner

*Primary Examiner*—Rodney Fuller
(74) *Attorney, Agent, or Firm*—Stanzione & Kim, LLP (57) ABSTRACT

A projection display includes first through third light source units to radiate first through third light beams, respectively, having different colors, an X-cube prism to combine paths of the first through third light beams, an optical modulator to sequentially modulate the first through third light beams according to image information, and a projection lens unit to magnify and project the modulated light beams onto a screen. Each of the first through third light source units includes at least one optical module. The optical module includes a collimator having a first reflective surface in a parabolic shape, and a compact light source located in the vicinity of a focal point of the first reflective surface.

23 Claims, 9 Drawing Sheets

PROJECTION DISPLAY

CROSS-REFERENCE TO RELATED APPLICATIONS

This application claims the benefit of Korean Patent Application No. 10-2004-36654, filed on May 22, 2004, in the Korean Intellectual Property Office, the disclosure of which is incorporated herein in its entirety by reference.

BACKGROUND OF THE INVENTION

1. Field of the Invention

The present general inventive concept relates to a projection display which modulates a plurality of light beams having different colors so as to be suitable for image information and magnifies and projects the modulated light beams to display a color image.

2. Description of the Related Art

Projection displays include optical modulators for modulating light to be suitable for image information and illumination units for illuminating the optical modulators. A metal halide lamp, a super-high voltage mercury lamp, or the like has been used as an illuminating unit. However, these lamps have short life spans of several thousands of hours at most. Hence, when conventional projection displays including these lamps are used, these lamps need to be frequently replaced with new ones due to the short life spans. Also, the illumination units need color wheels to divide white light emitted from these lamps into red (R), green (G), and blue (B) light beams, so the illumination units are enlarged.

Recently, projection displays adopting compact light sources, such as a light emitting diode (LED), are under development. Japanese Patent Publication Nos. 2001-305658 and 2003-186110 disclose projection displays utilizing LEDs. LEDs emit relatively less light than a metal halide lamp or a super-high voltage mercury lamp. Accordingly, an array of LEDs is used as a light source of a projection display. To increase the amount of effective light incident upon a screen, the light is collimated before the light emitted from the LED is projected onto an optical modulator. In this case, a light-condensing efficiency is degraded due to characteristic of lenses that must be included in a condensing optical system.

SUMMARY OF THE INVENTION

The present general inventive concept provides a projection display including a compact illuminating optical system that has a long life span.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a projection display including first through third light source units juxtaposed with one another to sequentially radiate first through third light beams having different colors in an identical direction, an optical modulator to sequentially modulate the first through third light beams according to image information, and a projection lens unit to magnify and project the modulated light beams onto a screen. Each of the first through third light source units includes at least one optical module. The optical module includes a collimator having a first reflective surface in a parabolic shape, and a compact light source located in the vicinity of a focal point of the first reflective surface.

The foregoing and/or other aspects and advantages of the present general inventive concept may also be achieved by providing a projection display including first through third light source units to radiate first through third light beams, respectively, having different colors, an X-cube prism to combine paths of the first through third light beams, an optical modulator to sequentially modulate the first through third light beams according to image information, and a projection lens unit to magnify and project the modulated light beams onto a screen. Each of the first through third light source units comprises at least one optical module. The optical module includes a collimator having a first reflective surface in a parabolic shape, and a compact light source located in the vicinity of a focal point of the first reflective surface.

The foregoing and/or other aspects and advantages of the present general inventive concept may also be achieved by providing a projection display including first through third light source units to radiate first through third light beams, respectively, having different colors, a trichroic prism to combine paths of the first through third light beams, an optical modulator to sequentially modulate the first through third light beams according to image information, and a projection lens unit to magnify and project the modulated light beams onto a screen. Each of the first through third light source units includes at least one optical module. The optical module includes a collimator having a first reflective surface in a parabolic shape, and a compact light source located in the vicinity of a focal point of the first reflective surface.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
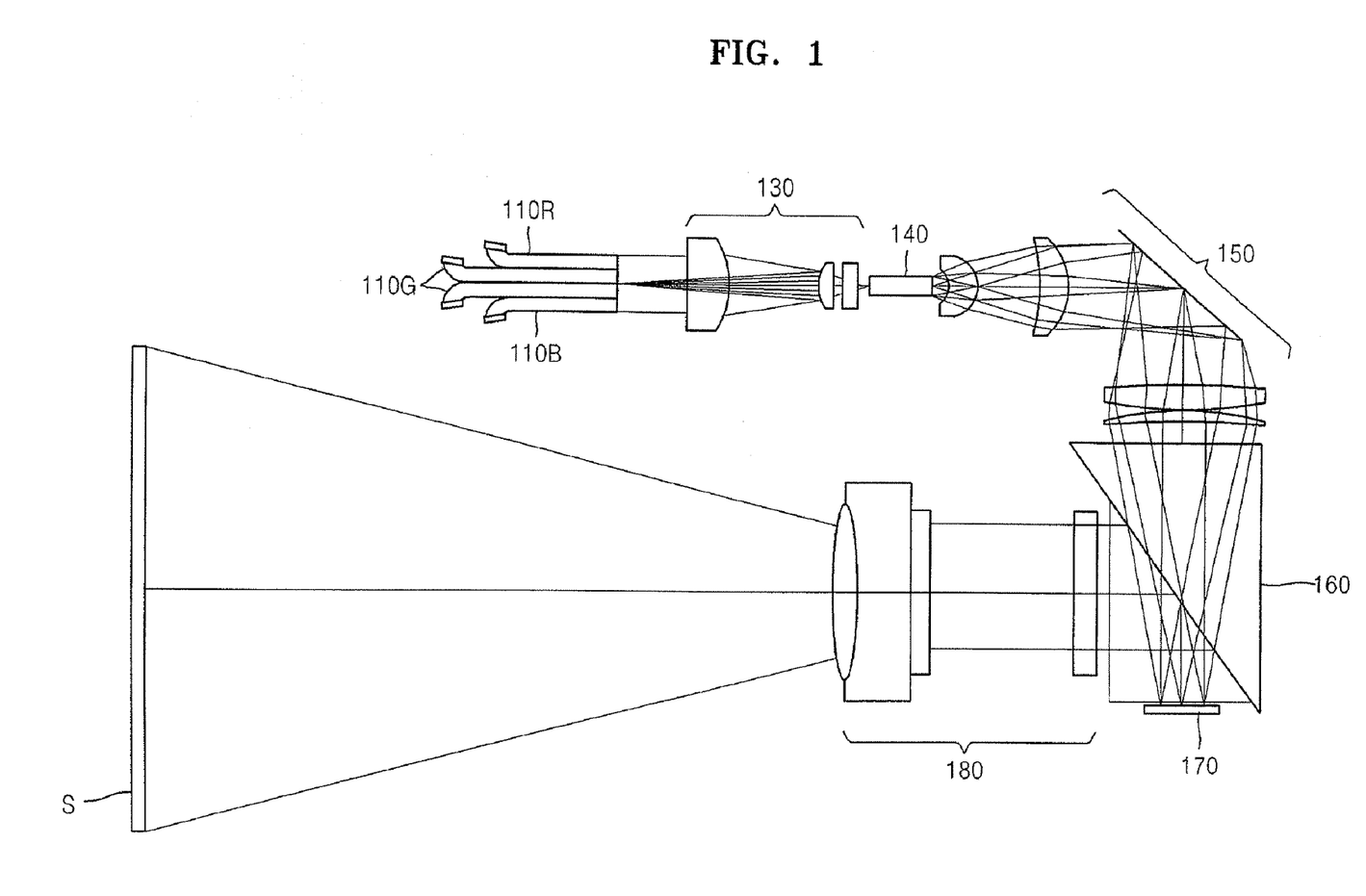
FIG. 1 is a schematic diagram illustrating a projection display according to an embodiment of the present general inventive concept.
Figure 7:
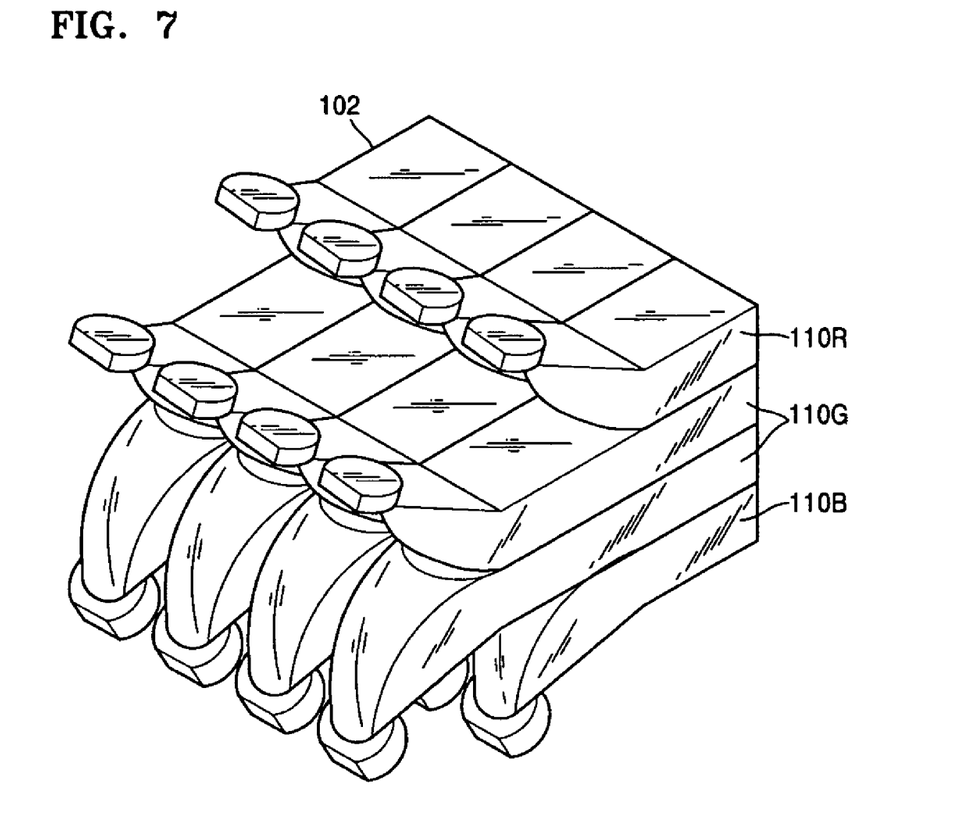
FIG. 7 is a perspective view illustrating a light source unit which is an array of optical modules.

Referring to FIG. 1, a projection display according to an embodiment of the present general inventive concept includes first through third light source units 110R, 110G, and 110B to emit first through third light beams R, G, and B, respectively, an optical modulator 170 to sequentially modulate the first through third light beams R, G, and B according to image information, and a projection lens unit 180 to magnify and project the modulated first through third light beams R, G, and B onto a screen S. The projection display may further include at least one condensing lens 130, an integrator 140, a relay lens unit 150, and a total internal reflection (TIR) prism 160. This projection display is a single-plate projection display using a single optical modulator 170. The optical modulator 170 in this embodiment is a digital micromirror device (DMD). As illustrated in FIG. 7, each of the first through third light source units 110R, 110G, and 110B may include an array of a plurality of optical modules 101 of FIG. 2 (or 102 of FIG. 5). More specifically, each of the first and third light source units 110R and 110B may include an array of four optical modules 101 (or 102), and the second light source unit 110G may include an array of eight optical modules 101 (or 102).

Figure 2:
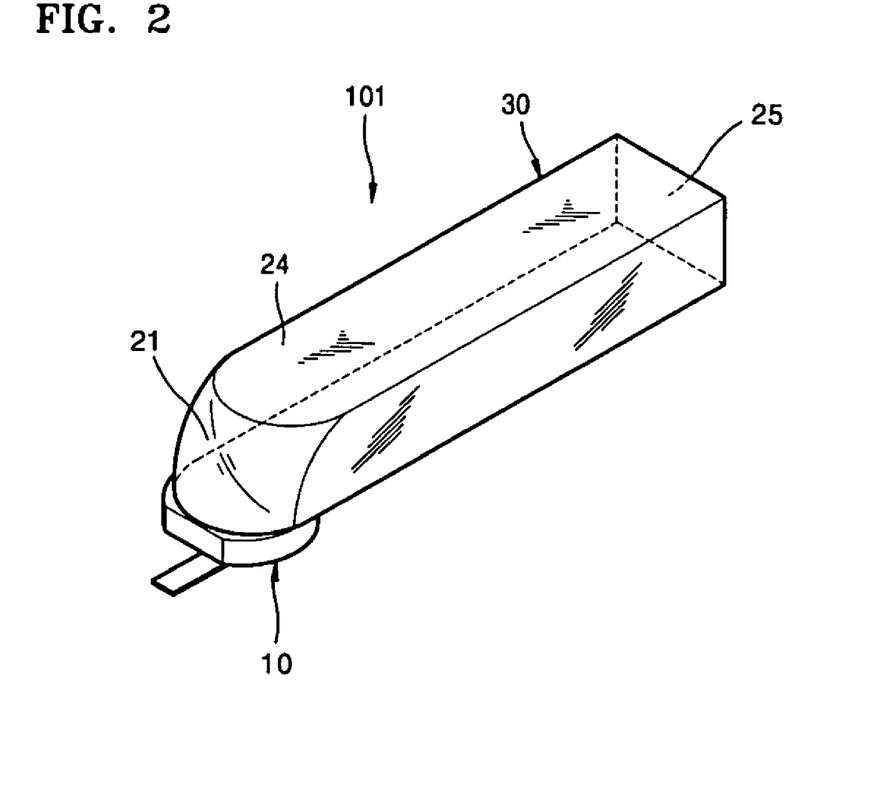
FIG. 2 is a perspective view illustrating an optical module used with a projection display according to another embodiment of the present general inventive concept.
Figure 3:
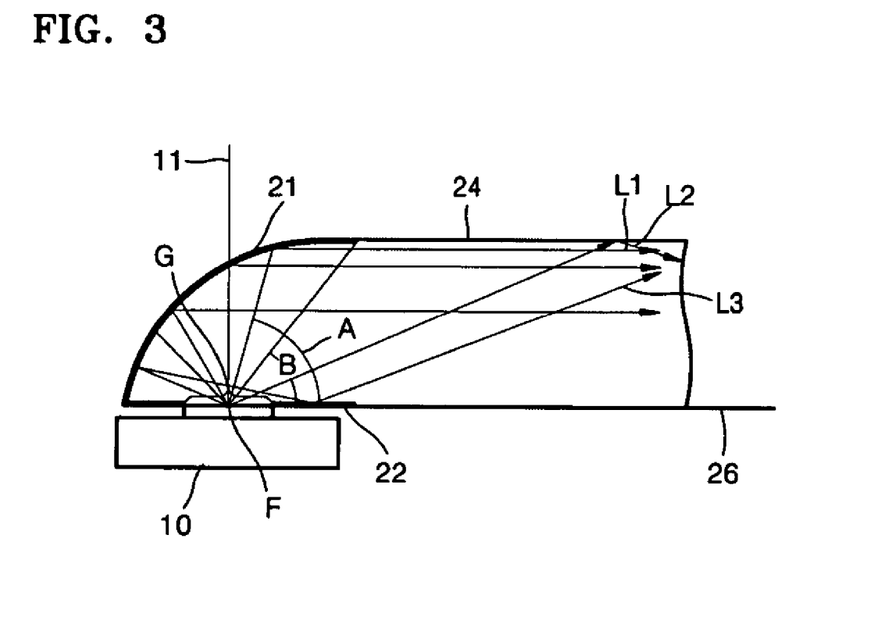
FIG. 3 is a side view of the optical module of FIG. 2.
Figure 4:
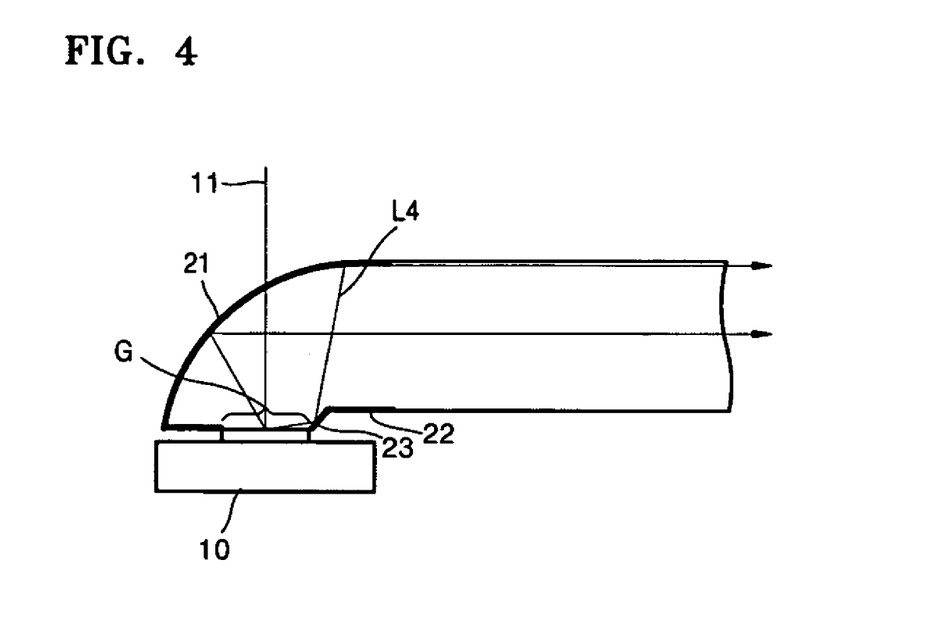
FIG. 4 is a side view illustrating an optical module used with a projection display according to another embodiment of the present general inventive concept.

FIG. 2 is a perspective view illustrating the optical module 101 used with the projection display according to an embodiment of the present general inventive concept. FIG. 3 is a side view of the optical module 101 of FIG. 2. Referring to FIGS. 2 and 3, the optical module 101 includes a collimator 30 and a compact light source 10. The compact light source 10 includes at least one LED, laser, or the like. The collimator 30 includes a first reflective surface 21 having a parabolic shape. The compact light source 10 is located in the vicinity of a focal point (F) of the first reflective surface 21. In this embodiment, the first reflective surface 21 is formed by processing one end of a glass rod 24, which is a hexahedron, to have a parabolic surface and then reflection-coating an exterior of the parabolic surface. The collimator 30 may further include a second reflective surface 22 having a plane shape. The second reflective surface 22 is formed such as to face the first reflective surface 21. The second reflective surface 22 has a window G, through which light is introduced from the compact light source 10. The second reflective surface 22 may be formed by performing a reflection treatment on a plane that faces the first reflective surface 21 of the glass rod 24 excluding the window G. In this embodiment, the compact light source 10 is disposed so that its optical axis 11 is perpendicular to a principle axis 26. However, this does not limit the scope of the present general inventive concept. In another embodiment of the optical module 101 illustrated in FIG. 4, the collimator 30 may further include a third reflective surface 23 at an edge of the window G. The third reflective surface 23 is inclined with respect to the second reflective surface 22.

Although a term "parabolic shape" is used to define the first reflective surface 21, this term does not denote only a parabola having a conic coefficient (K) of −1. The term "parabolic shape" used at least herein may denote an asphere having K of −0.4 to −2.5. It is possible that K is −0.7 to −1.6. The conic coefficient K of the first reflective surface 21 may be appropriately selected from the above-described range so as to collimate light emitted from the compact light source 10 within a radiation angle range in which an object is effectively illuminated with the light. Hereinafter, the first reflective surface 21 whose a cross-sectional shape including the principal axis 26 is the parabolic shape having the conic coefficient K of −1 will be described as an example.

The compact light source 10 radiates light beams at a radiation angle A between about 0° and 180°. The first reflective surface 21 is parabolic, and the compact light source 10 is located in the vicinity of the focal point F. Thus, a light beam L1 radiated at a radiation angle A greater than an aperture angle B of the first reflective surface 21 is reflected by the first reflective surface 21 to be parallel with the principal axis 26. Due to total reflection by the first reflective surface 21, the first light beam L1 travels within the glass rod 24 and is emitted through a light emission surface 25. A light beam L2 radiated from the compact light source 10 at the radiation angle A smaller than the aperture angle B is not incident on the first reflective surface 21 but directly propagated into the glass rod 24. Thus, the collimator 30 collimates a light beam that radiates from the compact light source 10 at the radiation angle A between 0° and 180°, so as to be emitted at an emission angle between 0° and the aperture angle B.

The compact light source 10 may not be disposed so that a radiating point is located exactly at the focal point F. Thus, some of the light beams radiating from the compact light source 10 may be reflected by the first reflective surface 21 toward the second reflective surface 22 not toward the glass rod 24. The second reflective surface 22 then reflects an incident beam L3 toward the light emission surface 25 so as to improve light efficiency. The third reflective surface 23 of FIG. 4 reflects a light beam L4, having the radiation angle smaller than the aperture angle B, toward the first reflective surface 21 so as to improve collimating efficiency.

An efficiency degradation of an optical system using lenses will now be described in greater detail with reference to FIGS. 12A and 12B, in which a single LED and an LED array are used, respectively. In a paraxial area, a product of a size and an angle of an image is conserved. Thus, the product of an emission area of an LED and a steradian of an emission angle of the LED is a conservation value which is called an "etendue." When the etendue is less than the product of the emission area of an optical modulator and the steradian calculated from an F value of a projection lens unit, a light condensing efficiency increases.

Figure 12A:
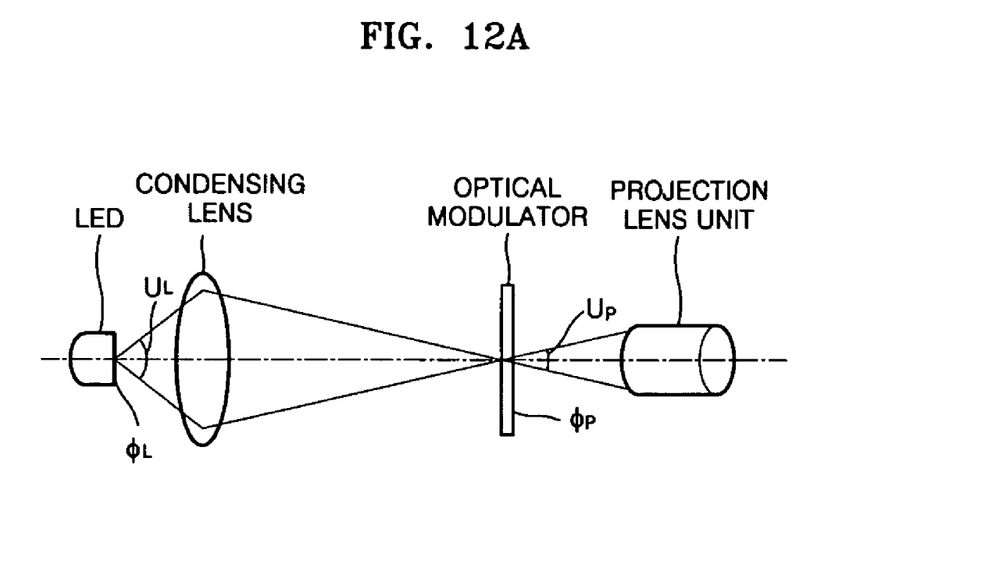
FIGS. 12A and 12B are views illustrating a degradation of a light condensing efficiency of an optical system that uses lenses.
Figure 12B:
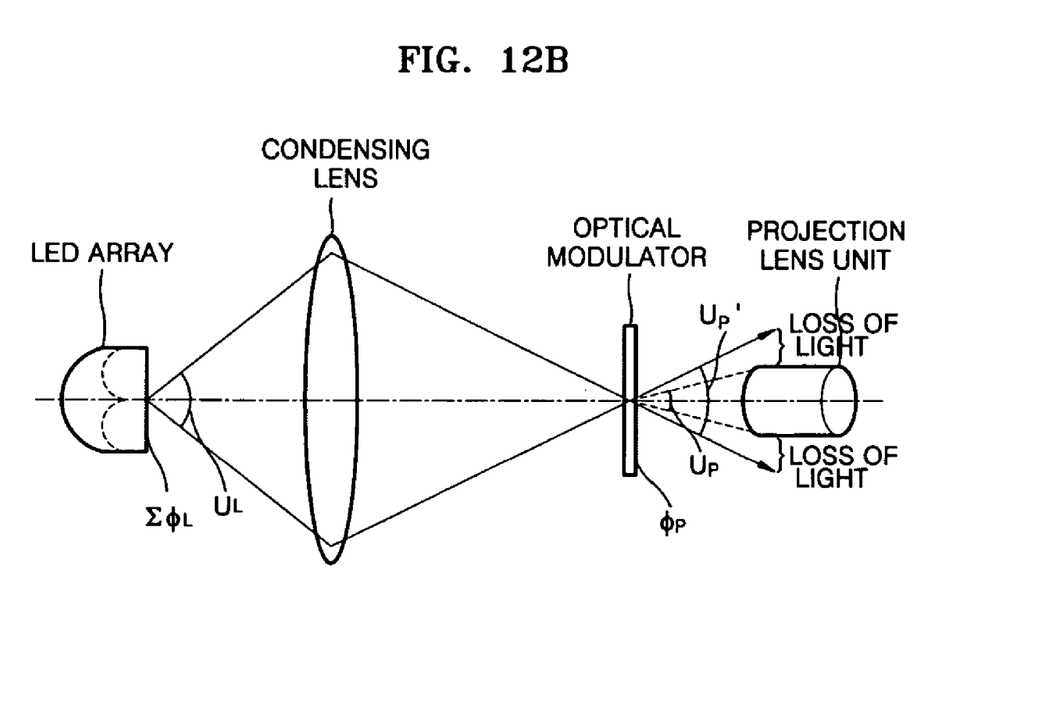

As shown in FIG. 12A, when the single LED is used, the product of the emission area $\Phi_L$ and the steradian $U_L$ of the LED may be equal to the product of the emission area $\Phi_P$ and the steradian $U_P$ of the optical modulator. As shown in FIG. 12B, when the LED array is used, the emission area $\Sigma\Phi_L$ of the LED array is larger than the emission area $\Phi_L$ of the single LED of FIG. 12A. Here, the steradian $U_L$ of the emission angle of the LED is equal to the steradian $U_L$ of the LED array, and the emission area $\Phi_P$ of the optical modulator of FIG. 12B is equal to the emission area $\Phi_P$ of the optical modulator of FIG. 12A. Therefore, in order to conserve the etendue, the steradian $U_P'$ of the emission angle of the optical modulator of FIG. 12B is larger than the steradian $U_P$ of the optical modulator of FIG. 12A. Accordingly, when the LED array as shown in FIG. 12B is used, at least a portion of light is lost, resulting in decreasing the light condensing efficiency and the luminance of the projection display.

Instead of using lenses, the optical module 101 uses the first reflective surface 21 to collimate the light beams emitted from the compact light source 10. Hence, the light beams can be collimated with high efficiency without the efficiency degradation due to lenses. Since the optical module 101 can be designed to have a very small size, the light source units 110R, 110G, and 110B are smaller than conventional lamps even though a plurality of optical modules 101 are arranged. Due to the collimating of light, the amount of light that can be effectively projected by the projection lens unit 180 is increased to thereby improve a light efficiency.

Figure 5:
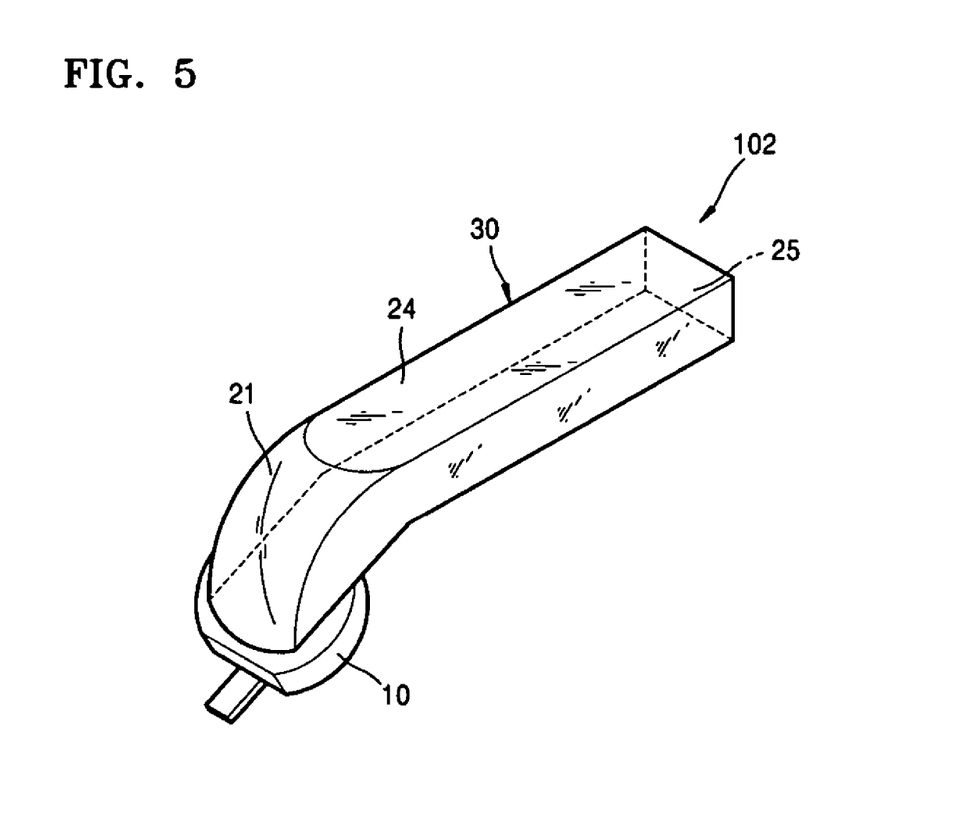
FIG. 5 is a perspective view illustrating an optical module used with a projection display according to another embodiment of the present general inventive concept.
Figure 6:
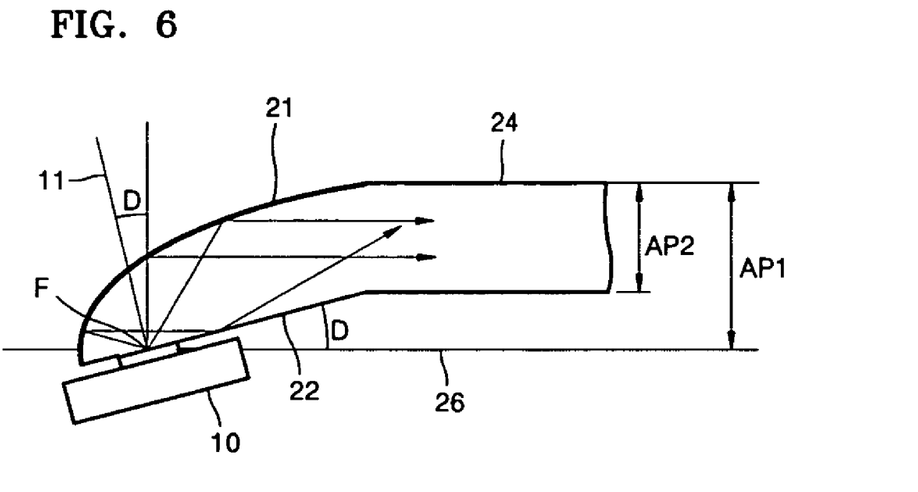
FIG. 6 is a side view of the optical module of FIG. 5.

FIG. 5 is a perspective view illustrating an optical module 102 used with a display device according to another embodiment of the present general inventive concept. FIG. 6 is a side view of the optical module 102 of FIG. 5. Referring to FIGS. 5 and 6, the optical module 102 has a second reflective surface 22, which is inclined with respect to the principal axis 26 of the first reflective surface 21 by an angle D. The compact light source 10 is installed so that the optical axis 11 is substantially or almost perpendicular to the second reflective surface 22. As a result, the optical axis 11 of the compact light source 10 inclines with respect to the principal axis 26 of the first reflective surface 21 by the angle D. Due to this structure, a size of an aperture of the optical module 102 can be reduced. Referring to FIG. 6, reference character AP1 denotes the size of the aperture of the optical module 101 shown in FIGS. 2 through 4, in which the second reflective surface 22 is parallel with the principal axis 26. Reference character AP2 denotes the size of the aperture of the optical module 102. As shown in FIG. 6, apparently, the size AP2 of the aperture of the optical module 102 is smaller than the size AP1 of the aperture of the optical module 101. The reduction in the size of an aperture is advantageous to the array of a plurality of compact optical modules 101 (or 102). In other words, since a lot of optical modules 102 can be arrayed in a narrow space, the amount of light emitted from each of the first through third light source units 110R, 110G, and 110B can be increased. Also, while an identical light amount is maintained, the sizes of the first through third light source units 110R, 110G, and 110B can be reduced. Each of the first through third light source units 110R, 110G, and 110B shown in FIG. 7 may be an array of the optical modules 102.

In the above-described embodiments, each of the optical modules 101 and 102 uses the glass rod 24. Although not shown, the first and second reflective surfaces 21 and 22 are formed by forming a parabolic surface on one end of a hollow optical tunnel and then reflection-coating the interior of the parabolic surface.

Referring to FIG. 1, the first through third light beams R, G, and B sequentially emitted from the first through third light source units 110R, 110G, and 110R are incident upon the integrator 140. The integrator 140 forms a planar light having a homogeneous light intensity. The integrator 140 may be either a glass rod having rectangular cross-sections or an optical tunnel having an internal reflective surface. The projection display further includes the at least one condensing lens 130 to condense the first through third light beams R, G, and B emitted from the first through third light source units 110R, 110G, and 110R and to propagate the condensed light beams onto the integrator 140. The light beams emitted from the integrator 140 are incident upon the optical modulator 170 via the total internal reflection (TIR) prism 160. The relay lens unit 150 scales up or down the light beams emitted from the integrator 140 in accordance with an aperture of the optical modulator 170. The optical modulator 170 sequentially modulates the first through third light beams R, G, and B so as to correspond to the image information. The modulated beams are guided by the TIR prism 160 toward the projection lens unit 180. The projection lens unit 180 magnifies and projects the modulated beams onto a screen S.

As described above, the projection display according to the embodiment of the present invention uses the compact light source 10 to thereby accomplish an extended life span of the light source units 110R, 110B, and 110G. The light condensing efficiency can be improved by collimating the light beams emitted from the light source units 110R, 110B, and 110G using the first reflective surface 21 instead of using lenses. The use of an array of a plurality of optical modules 101 (or 102) can increase a brightness of an image and also make the light source units 110R, 110B, and 110G compact. Also, a projection display having a simple structure can be obtained.

Figure 8:
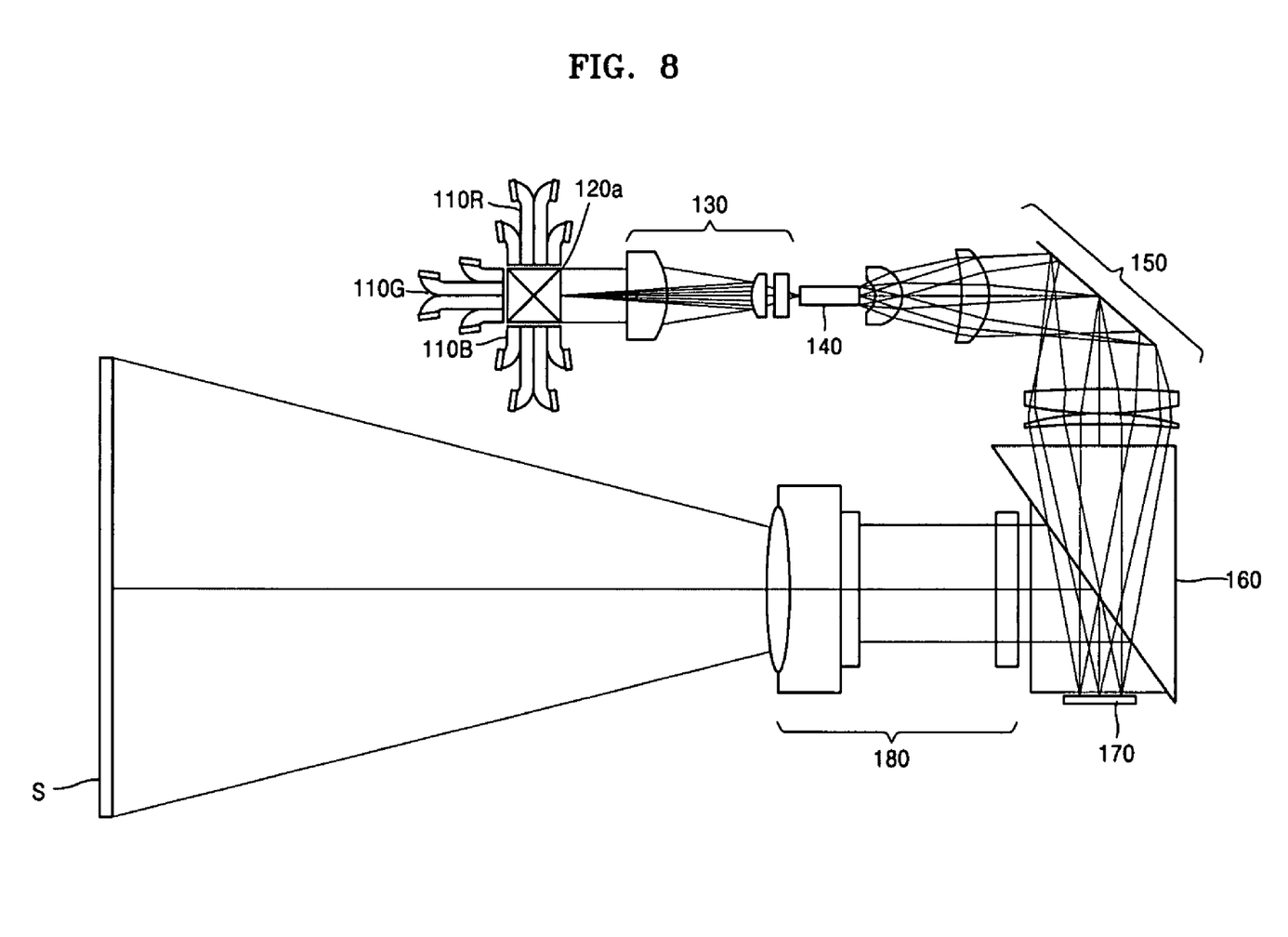
FIG. 8 is a schematic diagram illustrating a projection display according to another embodiment of the present general inventive concept.
Figure 9:
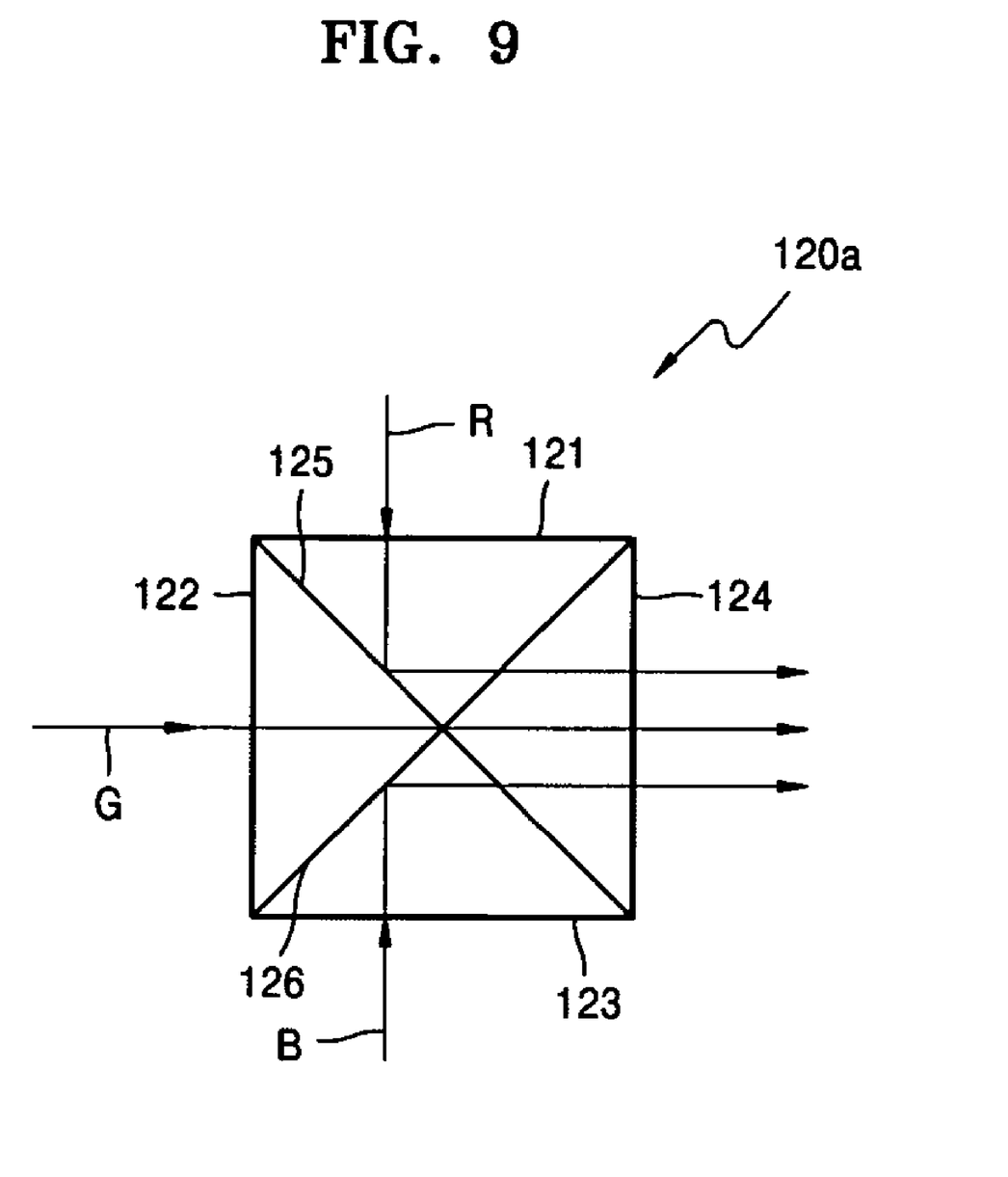
FIG. 9 is a view illustrating an X-cube prism of the projection display shown in FIG. 8.

FIG. 8 is a schematic diagram illustrating a projection display according to another embodiment of the present general inventive concept. The projection display of FIG. 8 is a modification of the previous embodiment of FIG. 1. In FIGS. 1 and 8, like numerals refer to the like element. The projection display of FIG. 8 includes an X-cube prism 120a, which is used as a combining unit to combine paths of the first through third light beams R, G, and B into an identical (common) path in an identical (common) direction, so that the first through third light beams R, G, and B are transmitted through the identical path in the identical direction toward the at least one condensing lens 130, the integrator 140, the relay lens unit 150, the TIR prism 160, and/or the optical modulator 170. Each of the first through light source units 110R, 110G, and 110B of FIG. 8 is formed with a two-dimension array 16 of the optical modules 102 (FIG. 2, 4, or 6) in a 4×4 configuration. Referring to FIG. 9, the X-cube prism 120a includes first through third incidence surfaces 121, 122, and 123, an emission surface 124, and first and second selective reflection surfaces 125 and 126. The first and second selective reflection surfaces 125 and 126 are disposed in an X configuration. The first through third light source units 110R, 110G, and 110B sequentially radiate the first through third light beams R, G, and B to the first through third incidence surfaces 121, 122, and 123, respectively. A selective reflection layer is formed on the first selective reflection surface 125 so as to reflect the first light beam R and transmit the second and third light beams G and B. Another selective reflection layer is formed on the second selective reflection surface 126 so as to reflect the third light beam B and transmit the first and second light beams R and G. The first through third light beams R, G, and B incident through the first through third incidence surfaces 121, 122, and 123, respectively, are emitted through the emission surface 124. In this structure, paths of the first through third light beams R, G, and B are combined.

Figure 10:
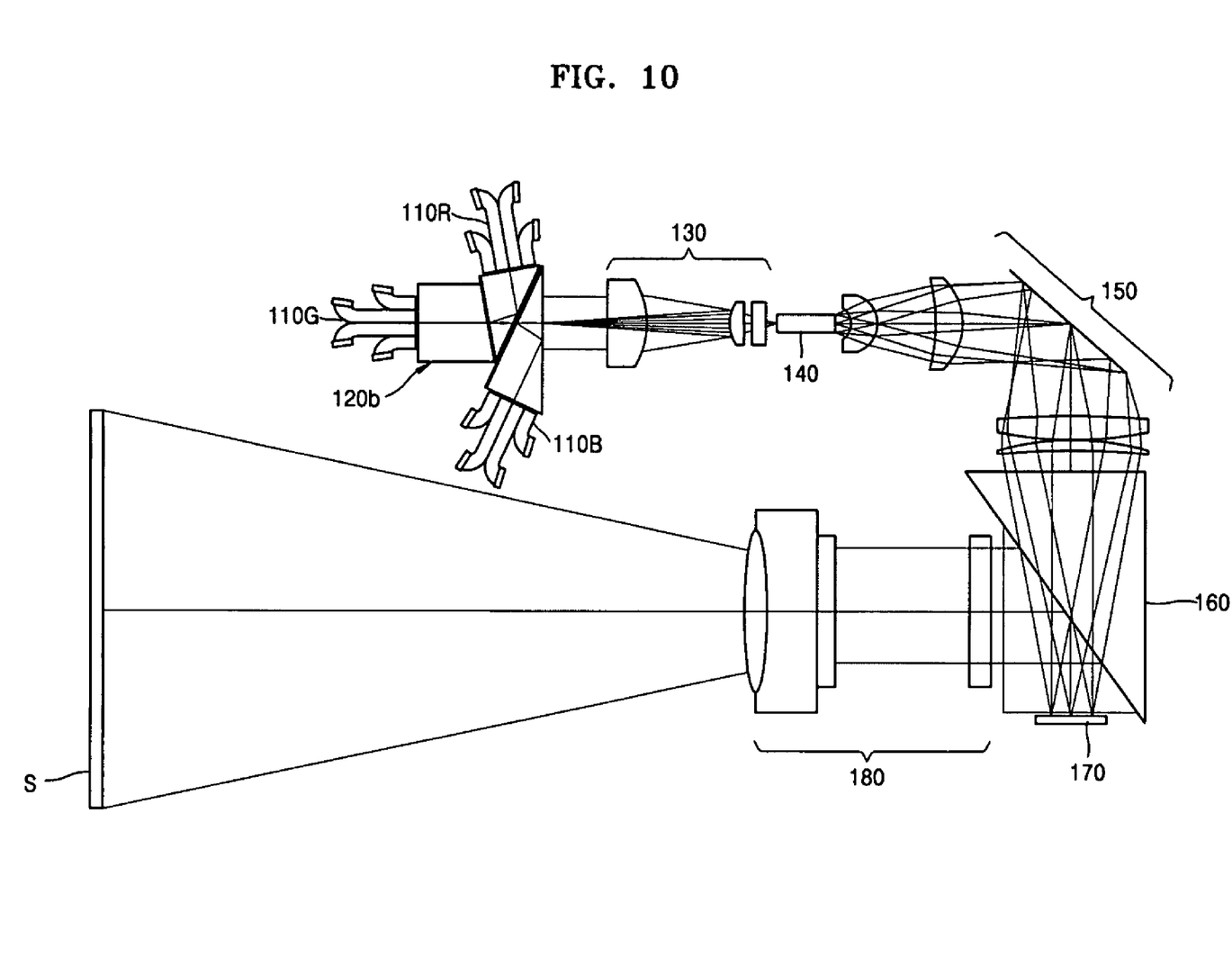
FIG. 10 is a schematic diagram illustrating a projection display according to another embodiment of the present general inventive concept.

FIG. 10 is a schematic diagram illustrating a projection display according to still another embodiment of the present general inventive concept. This projection display is a modification of the embodiment of FIG. 1. In FIGS. 1 and 10, like numerals refer to the like element. The projection display of FIG. 10 includes a trichroic prism 120b which is used as a combining unit to combine the paths of the first through third light beams R, G, and B.

Figure 11:
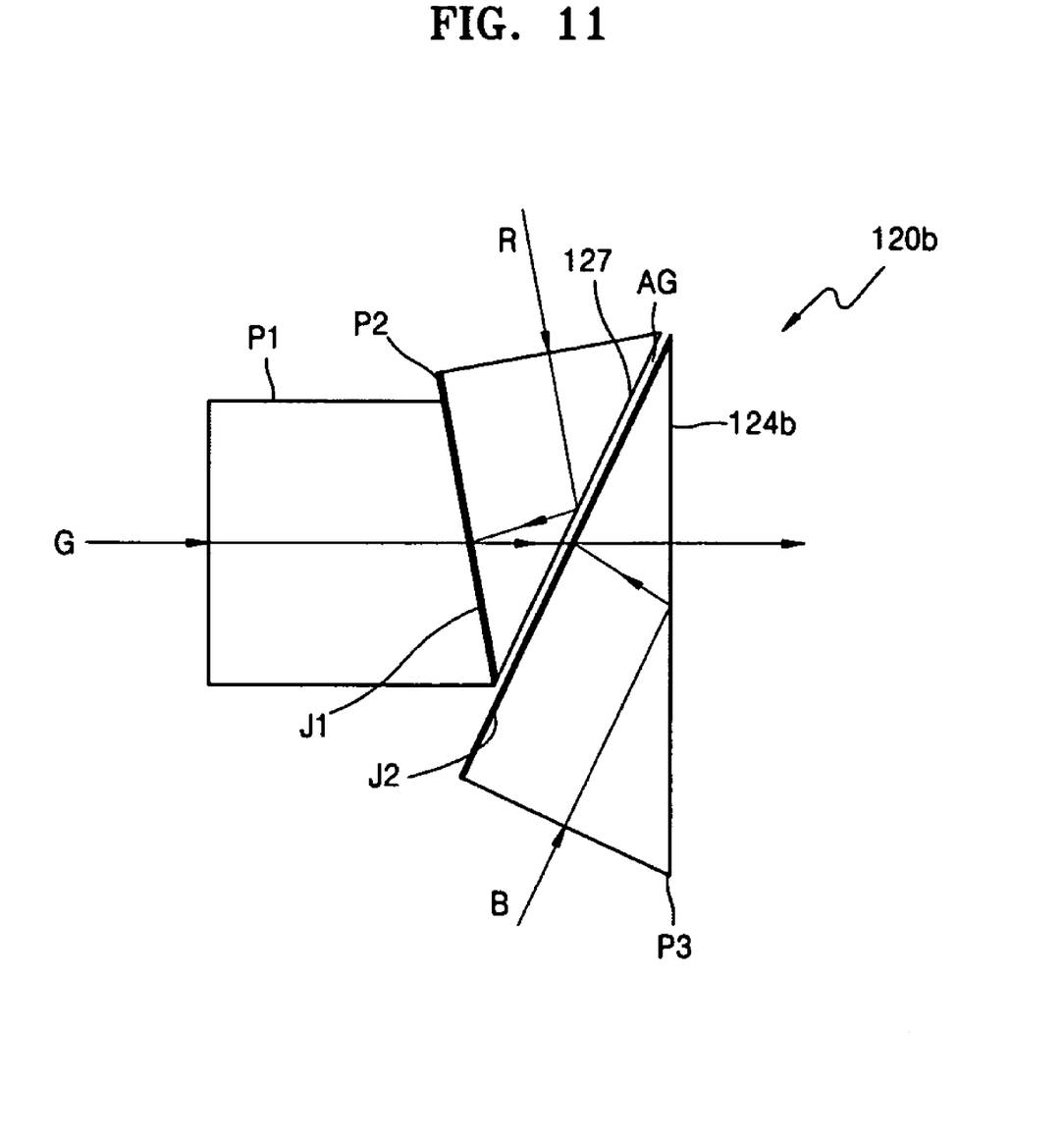
FIG. 11 is a view illustrating a trichroic prism of the projection display shown in FIG. 10.

FIG. 11 illustrates a structure of the trichroic prism 120*b* of the projection display of FIG. 10. Referring to FIG. 11, the trichroic prism 120*b* includes three prisms P1, P2, and P3. A selective reflection layer to reflect a first light and to transmit a second light is formed on each of a junction surface J1 between the prisms P1 and P2, and a junction surface J2 between the prisms P2 and P3. For example, the junction surface J1 reflects the first light beam R and transmits the second light beam G. The junction surface J2 reflects the third light beam B and transmits the first and second light beams R and G. In this structure, the first light beam R entering into the prism P2 is totally reflected by a boundary surface 127, which is adjacent to the prism P3, and incident upon the junction surface J1. Because a selective reflection layer to reflect the first light beam R is formed on the junction surface J1, the first light beam R is reflected by the junction surface J1, enters into the prism P3, and is then emitted through an emission surface 124*b*. To perform total reflection, an air gap (AG) may be formed between the prisms P2 and P3. The second light beam G incident upon the prism P1 passes through the second prism P2 and then the third prism P3 and is emitted through the emission surface 124*b*. The third light beam B incident upon the prism P3 is totally reflected by the emission surface 124*b* and incident upon the junction surface J2. Because a selective reflection layer to reflect the third light beam B is formed on the junction surface J2, the third light beam B is reflected by the junction surface J2 and then emitted through the emission surface 124*b*. In this structure, the paths of the first through third light beams R, G, and B are combined.

The first through third light beams R, G, and B sequentially emitted from the first through third light source units 110R, 110G, and 110R travel along an identical path by the X-cube prism 120*a* or the trichroic prism 120*b* and are incident upon the condensing lens 130. The condensing lens 130 condenses the first through third light beams R, G, and B and propagates the condensed light beams to the integrator 140. the integrator 140 forms a planar light having a homogeneous light intensity. The light beams emitted from the integrator 140 are incident upon the optical modulator 170 via the TIR prism 160. The relay lens unit 150 scales up or down the light beams emitted from the integrator 140 in accordance with an aperture of the optical modulator 170. The optical modulator 170 sequentially modulates the first through third light beams R, G, and B so as to correspond to the image information. The modulated beams are guided by the TIR prism 160 toward the projection lens unit 180. The projection lens unit 180 magnifies and projects the modulated beams onto the screen S.

As described above, the projection display of FIG. 10 uses the compact light source 10 to thereby accomplish the extended life span of the light source units 110R, 110B, and 110G. The light condensing efficiency can be improved by collimating the light beams emitted from the light source units 110R, 110B, and 110G using the first reflective surface 21 instead of using lenses. The use of an array of a plurality of optical modules 101 (or 102) can increase the brightness of the image and also make the light source units 110R, 110B, and 110G compact. Also, the combination of the paths of the light beams R, G, and B using the X-cube prism 120*a* or the trichroic prism 120*b* contributes to obtaining a projection display having a simple structure.

The projection displays according the aforementioned embodiments of the present general inventive concept have the following effects. First, life spans of light source units are prolonged due to the use of a compact light source.

Second, a light condensing efficiency is improved by the use of a collimator having an aspheric reflection surface to collimate light emitted from the compact light source.

Third, a single-panel projection display having a simple structure can be obtained by the use of an X-cube prism or a trichroic prism to combine different paths of three color beams.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection display comprising:
   first through third light source units juxtaposed with one another to sequentially radiate first through third light beams having different colors in an identical direction;
   an optical modulator to sequentially modulate the first through third light beams according to image information; and
   a projection lens unit to magnify and project the modulated light beams onto a screen,
   wherein each of the first through third light source units comprises one or more optical modules, and each of the one or more optical modules comprises a collimator having a first reflective surface in a parabolic shape, a compact light source located in the vicinity of a focal point of the first reflective surface, and a second reflective surface having a flat shape, located opposite to the first reflective surface with respect to the collimator.

2. The projection display of claim 1, wherein the second reflective surface has a window through which light emitted from the compact light source enters a main body of the collimator.

3. The projection display of claim 1, wherein:
   the second reflective surface is inclined with respect to a principal axis of the first reflective surface; and
   the compact light source is disposed so that an optical axis of the compact light source is inclined with respect to the principal axis at the same angle as an angle at which the second reflective surface is inclined with the principal axis.

4. The projection display of claim 2, wherein the collimator further comprises a third reflective surface inclined with respect to the second reflective surface at an edge of the window toward a corresponding one of the first through third light source units.

5. The projection display of claim 1, further comprising:
   an integrator disposed on an incidence side of the optical modulator to form a planar light having homogeneous light intensity.

6. The projection display of claim 5, further comprising:
   at least one condensing lens to condense the first through third light beams and to propagate the condensed light beams to the integrator.

7. The projection display of claim 1, wherein the optical modulator comprises a digital micromirror device (DMD).

8. The projection display of claim 1, wherein the one or more optical modules comprise a first array of the one or more optical modules, a second array of the one or more optical modules, and a third array of the one or more optical modules to correspond to the first through third light source units, respectively.

9. The projection display of claim 1, wherein the collimators of the one or more optical modules are disposed parallel to each other.

10. A projection display comprising:
first through third light source units to radiate first through third light beams, respectively, having different colors;
an X-cube prism to combine paths of the first through third light beams into an identical path;
an optical modulator to sequentially modulate the first through third light beams according to image information; and
a projection lens unit to magnify and project the modulated light beams onto a screen,
wherein each of the first through third light source units comprises at least one optical module, and the at least one optical module comprises a collimator having a first reflective surface in a parabolic shape, a compact light source located in the vicinity of a focal point of the first reflective surface, and a second reflective surface having a flat shape, located opposite to the first reflective surface with respect to the collimator.

11. The projection display of claim 10, wherein the second reflective surface has a window through which light emitted from the compact light source enters.

12. The projection display of claim 10, wherein:
the second reflective surface is inclined with respect to a principal axis of the first reflective surface; and
the compact light source is disposed so that an optical axis of the compact light source is inclined with respect to the principal axis at the same angle as an angle which is formed by the second reflective surface and the principal axis.

13. The projection display of claim 11, wherein the collimator further comprises a third reflective surface inclined with respect to the second reflective surface at an edge of the window toward a corresponding one of the first through third light source units.

14. The projection display of claim 10, further comprising:
an integrator disposed on an incidence side of the optical modulator to form a planar light having homogeneous light intensity.

15. The projection display of claim 14, further comprising:
at least one condensing lens to condense the first through third light beams and to propagate the condensed light beams to the integrator.

16. The projection display of claim 10, wherein the optical modulator comprises a digital micromirror device (DMD).

17. A projection display comprising:
first through third light source units to radiate first through third light beams, respectively, having different colors;
a trichroic prism to combine paths of the first through third light beams into an identical path;
an optical modulator to sequentially modulate the first through third light beams according to image information; and
a projection lens unit to magnify and project the modulated light beams onto a screen,
wherein each of the first through third light source units comprises at least one optical module, and the at least one optical module comprises a collimator having a first reflective surface in a parabolic shape, a compact light source located in the vicinity of a focal point of the first reflective surface, and a second reflective surface having a flat shape, located opposite to the first reflective surface with respect to the collimator.

18. The projection display of claim 17, wherein the second reflective surface has a window through which light emitted from the compact light source enters.

19. The projection display of claim 17, wherein:
the second reflective surface is inclined with respect to a principal axis of the first reflective surface; and
the compact light source is disposed so that an optical axis of the compact light source inclines with respect to the principal axis at the same angle as an angle which is formed by the second reflective surface and the principal axis.

20. The projection display of claim 18, wherein the collimator further comprises a third reflective surface inclined with respect to the second reflective surface at an edge of the window toward a corresponding one of the first through third light source units.

21. The projection display of claim 17, further comprising:
an integrator disposed on an incidence side of the optical modulator to form a planar light having homogeneous light intensity.

22. The projection display of claim 21, further comprising:
at least one condensing lens to condense the first through third light beams and to propagate the condensed light beams to the integrator.

23. The projection display of claim 17, wherein the optical modulator comprises a digital micromirror device (DMD).

* * * * *